United States Patent
Gafni et al.

(10) Patent No.: US 9,762,491 B2
(45) Date of Patent: Sep. 12, 2017

(54) DYNAMIC THRESHOLDS FOR CONGESTION CONTROL

(71) Applicant: MELLANOX TECHNOLOGIES TLV LTD., Ra'anana (IL)

(72) Inventors: Barak Gafni, Kfar Malal (IL); Benny Koren, Zichron Yaakov (IL); George Elias, Tel Aviv (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 10 days.

(21) Appl. No.: 14/672,357

(22) Filed: Mar. 30, 2015

(65) Prior Publication Data
US 2016/0294696 A1  Oct. 6, 2016

(51) Int. Cl.
*H04L 12/801* (2013.01)
*H04L 12/873* (2013.01)
(Continued)

(52) U.S. Cl.
CPC .......... *H04L 47/10* (2013.01); *H04L 47/522* (2013.01); *H04L 47/6295* (2013.01);
(Continued)

(58) Field of Classification Search
CPC ....... H04L 47/10; H04L 47/522; H04L 49/30; H04L 47/6295; H04L 49/3036; H04L 49/3081
See application file for complete search history.

(56) References Cited

U.S. PATENT DOCUMENTS 7,321,553 B2   1/2008  Prasad et al.
7,821,939 B2   10/2010 DeCusatis et al.
(Continued)

FOREIGN PATENT DOCUMENTS

WO   2013136355 A1   9/2013
WO   2013180691 A1   12/2013

OTHER PUBLICATIONS

IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for PAUSE Operation, Annex 31B (MAC Control PAUSE operation), pp. 763-772, year 2005.

(Continued)

*Primary Examiner* — Brian O'Connor
(74) *Attorney, Agent, or Firm* — D. Kligler IP Services Ltd.

(57) ABSTRACT

Communication apparatus includes multiple interfaces configured for connection to a packet data network. A memory, coupled to the interfaces, is configured as a shared buffer to contain packets in multiple sets of queues for transmission to the network. Each set of queues receives in the shared buffer a respective allocation having an allocation size that varies over time in response to an amount of space in the shared buffer that is unused at any given time. A controller is configured to apply congestion control to a respective fraction of the packets that are queued for transmission from each set of queues in the shared buffer to the network, such that the respective fraction is set for each set of queues at any given time in response to a relation between a length of the queues in the set and the allocation size of the respective allocation at the given time.

12 Claims, 3 Drawing Sheets

(51) Int. Cl.
*H04L 12/863* (2013.01)
*H04L 12/935* (2013.01)

(52) U.S. Cl.
CPC .......... *H04L 49/30* (2013.01); *H04L 49/3036* (2013.01); *H04L 49/3081* (2013.01)

(56) References Cited

U.S. PATENT DOCUMENTS

| | | |
|---|---|---|
| 8,078,743 B2 | 12/2011 | Sharp et al. |
| 8,345,548 B2 | 1/2013 | Gusat et al. |
| 8,473,693 B1 | 6/2013 | Muppalaneni et al. |
| 8,576,715 B2 | 11/2013 | Bloch et al. |
| 8,767,561 B2 | 7/2014 | Gnanasekaran et al. |
| 8,879,396 B2 | 11/2014 | Guay et al. |
| 8,995,265 B2 | 3/2015 | Basso et al. |
| 9,014,006 B2 | 4/2015 | Haramaty et al. |
| 9,325,619 B2 | 4/2016 | Guay et al. |
| 9,356,868 B2 | 5/2016 | Tabatabaee et al. |
| 9,426,085 B1 | 8/2016 | Anand et al. |
| 2004/0008714 A1 | 1/2004 | Jones |
| 2006/0088036 A1 | 4/2006 | De Prezzo |
| 2006/0092837 A1 | 5/2006 | Kwan et al. |
| 2006/0092845 A1 | 5/2006 | Kwan |
| 2007/0104102 A1 | 5/2007 | Opsasnick |
| 2007/0104211 A1 | 5/2007 | Opsasnick |
| 2009/0207848 A1 | 8/2009 | Kwan et al. |
| 2013/0014118 A1 | 1/2013 | Jones |
| 2013/0250757 A1 | 9/2013 | Tabatabaee et al. |
| 2013/0250762 A1 | 9/2013 | Assarpour |
| 2013/0275631 A1 | 10/2013 | Magro et al. |
| 2013/0305250 A1 | 11/2013 | Durant |
| 2014/0133314 A1 | 5/2014 | Matthews et al. |
| 2015/0026361 A1 | 1/2015 | Matthews et al. |
| 2015/0180782 A1 | 6/2015 | Rimmer et al. |

OTHER PUBLICATIONS

IEEE Std 802.1Qbb., IEEE Standard for Local and metropolitan area networks—"Media Access Control (MAC) Bridges and Virtual Bridged Local Area Networks—Amendment 17: Priority-based Flow Control", 40 pages, Sep. 30, 2011.

Hahne et al., "Dynamic Queue Length Thresholds for Multiple Loss Priorities", IEEE/ACM Transactions on Networking, vol. 10, No. 3, pp. 368-380, Jun. 2002.

Choudhury et al., "Dynamic Queue Length Thresholds for Shared-Memory Packet Switches", IEEE/ACM Transactions Networking, vol. 6, Issue 2, pp. 130-140, Apr. 1998.

Raindel et al., U.S. Appl. No. 14/247,255 dated Apr. 8, 2014.

Ramakrishnan et al., "The Addition of Explicit Congestion Notification (ECN) to IP", Request for Comments 3168, Network Working Group, 63 pages, Sep. 2001.

IEEE Standard 802.1Q™-2005, "IEEE Standard for Local and metropolitan area networks Virtual Bridged Local Area Networks", 303 pages, May 19, 2006.

Infiniband TM Architecture, Specification vol. 1, Release 1.2.1, Chapter 12, pp. 657-716, Nov. 2007.

U.S. Appl. No. 14/718,114 Office Action dated Sep. 16, 2016.

Gran et al., "Congestion Management in Lossless Interconnection Networks", Submitted to the Faculty of Mathematics and Natural Sciences at the University of Oslo in partial fulfillment of the requirements for the degree Philosophiae Doctor, 156 pages, Sep. 2013.

Pfister et al., "Hot Spot Contention and Combining in Multistage Interconnect Networks", IEEE Transactions on Computers, vol. C-34, pp. 943-948, Oct. 1985.

Zhu et al., "Congestion control for large-scale RDMA deployments", SIGCOMM'15, pp. 523-536, Aug. 17-21, 2015.

U.S. Appl. No. 14/994,164 Office Action dated Jul. 5, 2017.

DYNAMIC THRESHOLDS FOR CONGESTION CONTROL

FIELD OF THE INVENTION

The present invention relates generally to packet communication networks, and particularly to methods and systems for control of congestion in such networks.

BACKGROUND

Network congestion occurs when a link or node in the network is required to carry more data traffic than it is capable of transmitting or forwarding, with the result that its quality of service deteriorates. Typical effects of congestion include queueing delay, packet loss, and blocking of new connections. Modern packet networks use congestion control (including congestion avoidance) techniques to try to mitigate congestion before catastrophic results set in.

A number of congestion avoidance techniques are known in the art. In random early detection (RED, also known as random early discard or random early drop), for example, network nodes, such as switches, monitor their average queue size and drop packets based on statistical probabilities: If a given queue (or set of queues) is almost empty, all incoming packets are accepted. As the queue grows, the probability of dropping an incoming packet grows accordingly, reaching 100% when the buffer is full. Weighted RED (WRED) works in a similar fashion, except that different traffic classes are assigned different thresholds, so that for a given queue length, low-priority packets have a greater probability of being dropped than high-priority packets. Congestion control techniques of this sort, which operate on a fraction of packets that is determined by statistical probabilities, are referred to herein as statistical congestion control techniques.

Another congestion avoidance technique is Explicit Congestion Notification (ECN), which is an extension to the Internet Protocol (IP) and the Transmission Control Protocol (TCP). ECN was initially defined by Ramakrishnan, et al., in "The Addition of Explicit Congestion Notification (ECN) to IP," which was published as Request for Comments (RFC) 3168 of the Internet Engineering Task Force (2001) and is incorporated herein by reference. ECN provides end-to-end notification of network congestion without dropping packets, by signaling impending congestion in the IP header of transmitted packets. The receiver of an ECN-marked packet of this sort echoes the congestion indication to the sender, which reduces its transmission rate as though it had detected a dropped packet. ECN functionality has recently been extended to other transport and tunneling protocols.

In shared-memory switching architectures, the queues for multiple interfaces of a network element (such as ports of a switch) are maintained in a common memory buffer. Each queue is assigned a certain maximum fraction of the memory, wherein the sum of all the fractions may be greater than one in order to take full advantage of the available memory. In some buffer management schemes of this sort, the fractional shares of the different queues are not fixed, but rather are defined dynamically, meaning that the maximum permissible length of any given queue (above which packets are dropped from the queue) varies over time, depending on the overall occupancy of the buffer. In other words, when the shared buffer is relatively empty, the maximum permitted queue length increases, and this maximum length decreases as the buffer fills.

Hahne and Choudhury, for example, describe a scheme of this sort in "Dynamic Queue Length Thresholds for Multiple Loss Priorities," *IEEE/ACM Transactions on Networking* 10:3 (June, 2002), pages 368-380, which is incorporated herein by reference. According to this scheme, the maximum permissible queue length in a shared-memory packet switch is proportional to the unused buffering in the switch. Each queue receives a certain amount of buffer space, called the "control threshold," and incoming data cells are admitted to the switch only if the queue length is less than the control threshold. The control threshold $T(t)$ for each queue t is proportional to the amount of space in the buffer that is currently unused, with a proportionality constant $\alpha$:

$$T(t) = \alpha(B - Q(t)) = \alpha\left(B - \sum_i Q^i(t)\right)$$

Here B is the total buffer size, and $Q(t)$ is the aggregate amount of space occupied in the buffer by all of the queues, each of which occupies the respective space $Q^i(t)$.

SUMMARY

Embodiments of the present invention that are described hereinbelow provide improved methods and systems for congestion control in a network.

There is therefore provided, in accordance with an embodiment of the invention, communication apparatus, which includes multiple interfaces configured for connection to a packet data network. A memory is coupled to the interfaces and configured as a shared buffer to contain packets in multiple sets of queues for transmission to the network. Each set of queues receives in the shared buffer a respective allocation having an allocation size that varies over time in response to an amount of space in the shared buffer that is unused at any given time. A controller is configured to apply congestion control to a respective fraction of the packets that are queued for transmission from each set of queues in the shared buffer to the network, such that the respective fraction is set for each set of queues at any given time in response to a relation between a length of the queues in the set and the allocation size of the respective allocation at the given time.

In some embodiments, the allocation size for each set of queues at any given time is determined by a threshold, which is equal to a product of the amount of the unused space in the buffer multiplied by a respective constant of proportionality. The respective constant of proportionality may be set to different, respective values for different ones of the sets of queues.

Typically, the respective fraction of the packets in each set of queues to which the congestion control is applied increases as the current length of the queues in the set approaches the allocation size of the respective allocation. Additionally or alternatively the respective fraction of the packets in each set of queues to which the congestion control is applied increases as the allocation size of the respective allocation decreases in response to increasing buffer occupancy by other queues. In a disclosed embodiment, the controller is configured to compute the respective fraction of the packets in each set of queues to which the congestion control is to be applied as a function of a ratio between the length of the queues in the set and the allocation size of the respective allocation.

In one embodiment, the congestion control includes adding a congestion notification to the packets in the respective fraction in each set of queues. In another embodiment, the congestion control includes dropping the respective fraction of the packets from each set of queues. Additionally or alternatively, the congestion control includes sending copies of the packets to at least one of a source of the packets and a network controller.

There is also provided, in accordance with an embodiment of the invention, a method for communication in a network element having multiple interfaces connected to a packet data network and a memory coupled to the interfaces and configured as a shared buffer to contain packets in multiple sets of queues for transmission to the network. The method includes allocating to each set of queues in the shared buffer a respective allocation having an allocation size that varies over time in response to an amount of space in the shared buffer that is unused at any given time. Congestion control is applied to a respective fraction of the packets that are queued for transmission from each set of queues in the shared buffer to the network, while setting the respective fraction for each set of queues at any given time in response to a relation between a length of the queues in the set and the allocation size of the respective allocation at the given time.

The present invention will be more fully understood from the following detailed description of the embodiments thereof, taken together with the drawings in which:

DETAILED DESCRIPTION OF EMBODIMENTS

Figure 1:
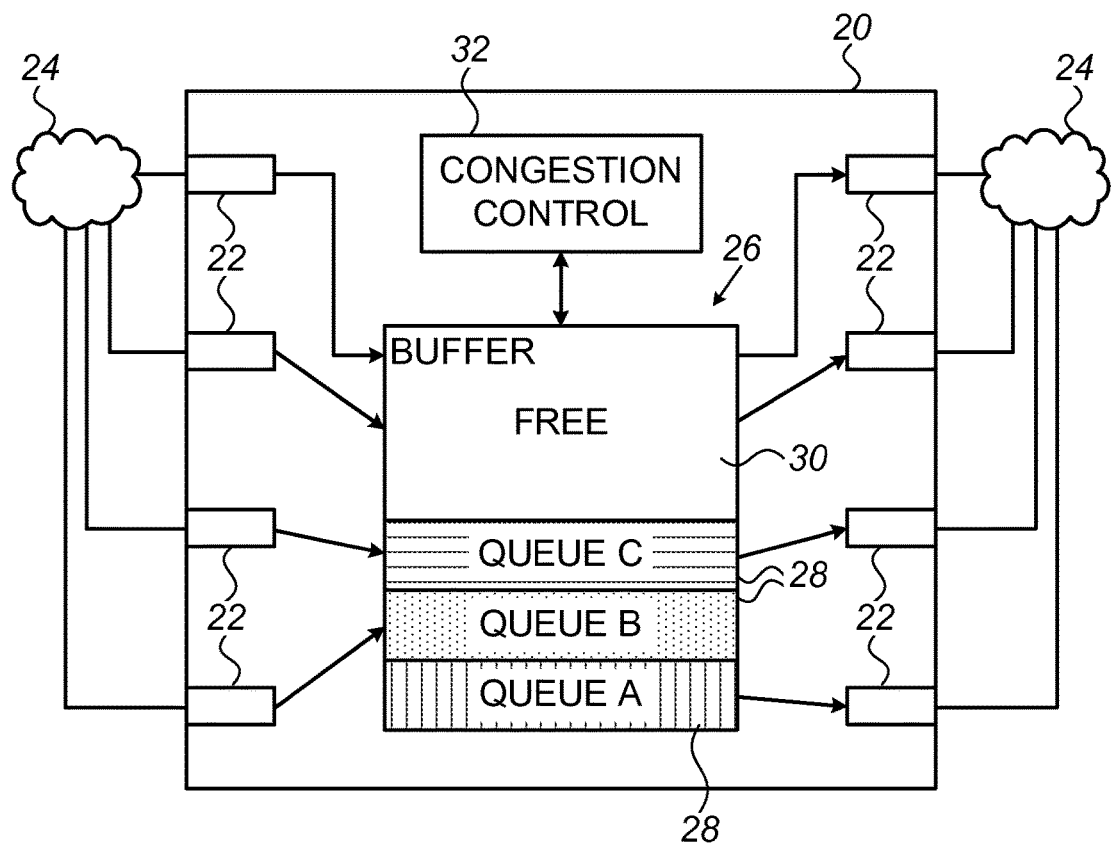
FIG. 1 is a block diagram that schematically illustrates a switch with a shared buffer, in accordance with an embodiment of the invention.

In statistical congestion control techniques that are known in the art, such as ECN and WRED, congestion control measures are applied to a certain fraction of the packets that are to be transmitted from each queue in a network element to the network, depending on the respective length of each queue. In other words, a certain fixed threshold is defined for each queue, and the probability that a given packet will be marked with a congestion notification (such as in ECN) or dropped (such as in WRED) depends on the relation between the current length of that queue and the threshold. Even in shared-buffer devices, the threshold generally remains fixed regardless of whether the buffer as a whole is relatively full or empty.

By contrast, in dynamic buffer sharing schemes, as described above in the Background section, the buffer allocation size for each set of queues varies over time depending on the amount of space in the shared buffer that is unused at any given time. The term "allocation" is used in the present description and in the claims in its usual sense, to mean the amount or portion of the buffer that is assigned to each set of queues, including both the buffer volume that the set of queues occupies at any given moment and the additional free buffer volume that the set of queues is allowed to use. A "set of queues" in this context can be a single queue, or it can comprise a number of queues that are grouped together for purposes of buffer allocation. For example, a set of queues may comprise all or a group of the queues that are directed to a given port, or a group of queues with the same priority that are directed to a group of ports. As a queue is thus a particular instance of a set of queues, references in the description that follows to a queue should be understood as encompassing, mutatis mutandis, application of the disclosed techniques to sets of multiple queues, as well; and references in the description and in the claims to the length of a queue or set of queues should be understood as referring, where appropriate, to the aggregated lengths of the individual queues in the set.

This sort of dynamic, flexible buffering is not entirely compatible with existing statistical congestion control mechanisms, since the fixed thresholds used by such mechanisms can lead to marking or dropping of an unnecessarily large fraction of the packets when the shared buffer is relatively empty, or of too small a fraction of the packets when the shared buffer is nearly full. As a result, the congestion control mechanism may not operate with full efficiency, since it may, for example, cause a switch to drop too many packets or cause a network endpoint to set the size of its TCP window either larger or smaller than the setting that is actually optimal under current conditions.

The embodiments of the present invention that are described hereinbelow address this problem by setting (and changing) the respective fraction of the packets in each queue (or set of multiple queues) to which congestion control is to be applied at any given time in response to a relation between the current length of the queue and the current allocation size of the queue in the shared buffer. In other words, the queue-length thresholds used in congestion control are not fixed, but rather vary as the overall fill level of the buffer changes. Specifically, the congestion control thresholds typically increase as the buffer empties and decrease as the buffer fills. In general, this relation causes the respective fraction of the packets in each queue to which congestion control is applied to increase as the current length of the queue approaches the size of the current buffer allocation for the queue. Similarly, for a given queue length, the congestion control fraction for a given queue will increase as the allocation size of the queue in the shared buffer decreases in response to increasing buffer occupancy by other queues.

In some embodiments, the allocation size for each queue at any given time is determined by a threshold, which is equal to a product of the amount of the unused space in the buffer multiplied by a respective constant of proportionality (such as the proportionality constant $\alpha$ that is defined above). This constant may be the same for all queues, or it may alternatively be set to different, respective values for different queues. Alternatively, the principles of the present invention may similarly be applied to enhance the efficiency of congestion control in conjunction with other dynamic buffer sharing schemes that are known in the art, such as schemes based on a non-linear relation (for example, a quadratic relation) between allocation size and unused buffer space.

Furthermore, although the embodiments described below relate specifically to ECN and WRED, the principles of the present invention may be applied to substantially any other statistical congestion control mechanism that is known in the art, as well as deterministic (non-statistical) schemes. For example, the techniques described herein may be adapted to operate in conjunction with Quantized Congestion Notification (QCN), as defined in IEEE Standard 802.1Q, in which the node experiencing congestion sends copies of the packets to either the source of the packets or a network controller. As another example, these techniques may operate in conjunction with forward and backward ECN (FECN/BECN), as defined in the InfiniBand specification FIG. 1 is a block diagram that schematically illustrates a network switch 20 with a shared buffer, in accordance with an embodiment of the invention. Switch 20 comprises multiple interfaces 22, which are connected to a packet data network 24. A memory 26, coupled to interfaces 22, is configured as a shared buffer to contain packets in multiple queues for transmission to the network. Each queue receives a respective allocation 28 in the shared buffer in memory 26, while an unused portion 30 of the buffer remains free to receive further packets.

The allocation size of each allocation 28 (i.e., the amount of buffer that the queue is permitted to use, or equivalently, the control threshold) varies over time, depending on the amount of memory space that is available in unused portion 30 at any given time. For example, each queue may receive an allocation determined by a respective control threshold T(t), as defined above in the Background section, with the same or different values of the proportionality constant α. When a given queue has reached its control threshold, switch 20 will inhibit further packets from joining the queue, for example by dropping packets destined for that queue that arrive from network 24 or imposing back pressure using a flow control mechanism, until the queue length has decreased below the threshold. Allocations 28 may be set and monitored by a controller 32 or by other control logic (not shown) that is associated with memory 26.

Controller 32 applies statistical congestion control, such as ECN or WRED, to a respective fraction of the packets that are queued for transmission to network 24 from each queue in memory 26. Alternatively, controller 32 may apply a non-statistical congestion control approach. The fraction of the packets to be marked or dropped in this context is set for each queue at any given time based on a relation between the length of the queue and the allocation size of the respective allocation 28 at the given time. As explained earlier, because the allocation sizes typically change over time, for any given queue length the fraction of packets that are marked or dropped will change together with the allocation size. Typically, the larger the current allocation, the smaller the fraction of packets that are marked or dropped. Details of this mechanism are described below with reference to FIGS. 2 and 3.

Although the present description relates, for the sake of concreteness and clarity, to the specific switch 20 that is shown in FIG. 1, the principles of the present invention may similarly be applied, mutatis mutandis, to any network element that uses a shared buffer and implements the sorts of congestion control techniques that are described herein. Thus, in alternative embodiments, these principles may be applied not only in different types of switching apparatus, such as routers and bridges, but also, for example, in advanced network interface controllers that connect a host computer to a network. Furthermore, although the present embodiments relate particularly to congestion control in IP networks and make use of techniques, such as ECN, that have been defined specifically for such networks, the principles of the present invention may alternatively be applied in other sorts of networks and under different protocols to which statistical (or possibly non-statistical) congestion control is relevant, such as MPLS, InfiniBand, and Ethernet.

Figure 2A:
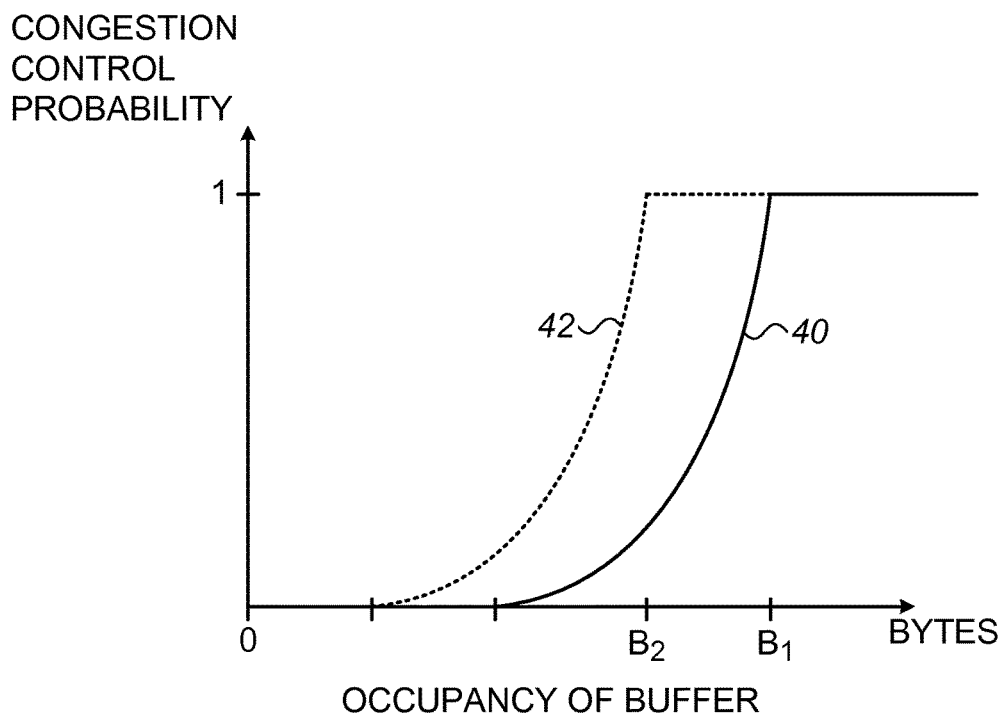
FIGS. 2A and 2B are plots that schematically show congestion control probabilities as a function of buffer occupancy, in accordance with an embodiment of the invention.
Figure 2B:
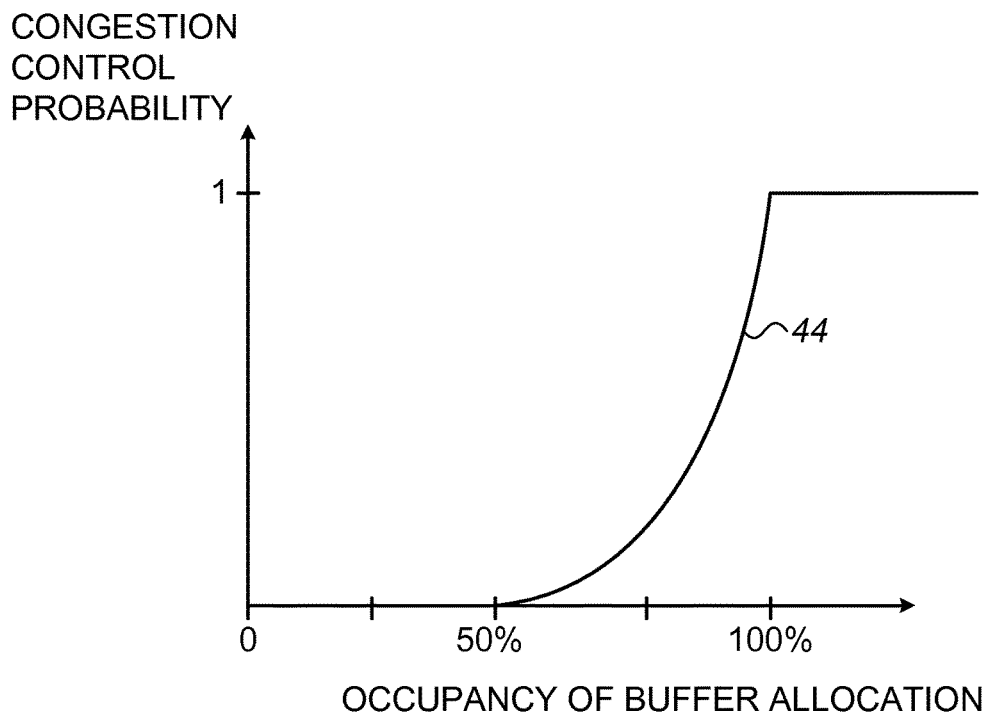

FIGS. 2A and 2B are plots that schematically show congestion control probabilities as a function of buffer occupancy, in accordance with an embodiment of the invention. FIG. 2A shows the probability as a function of the absolute occupancy of the buffer (in units of bytes), whereas FIG. 2B shows the probability as a function of fractional occupancy of the current buffer allocation. Two curves 40, 42 are shown in FIG. 2A, corresponding to two different sizes of buffer allocation 28, $B_1$ and $B_2$, for the queue in question. Curve 40 corresponds to a situation in which there is a relatively large amount of free buffer space available in unused portion 30, whereas in the case of curve 42, the free space has shrunk, and the size of allocation 28 is reduced accordingly. The abscissa of the plot indicates the level of occupancy of the buffer (or in other words, the length of the corresponding queue).

In FIG. 2B, on the other hand, the abscissa is marked as a fractional ratio (in percent) of the queue length to the current control threshold T(t). Thus, a single curve 44 reflects the congestion control probability regardless of variations in the current allocation size.

The ordinate in FIGS. 2A and 2B indicates the congestion control probability, i.e., the fraction of the queued packets in allocation 28 to which controller 32 will apply statistical congestion control, for example by marking (ECN) or dropping (WRED) the corresponding fraction of the queued packets. In the example shown in FIGS. 2A and 2B, the fraction is zero until the buffer occupancy reaches half of allocation 28. As occupancy grows above this point, the fraction of marked or dropped packets increases until, at full occupancy of allocation 28, all packets in this queue are marked or dropped. Curves 40 and 42 both apply congestion control to the same fraction of the packets for any given proportion of buffer occupancy relative to the current allocation 28, as illustrated by curve 44. Because allocation 28 is smaller for curve 42 than for curve 40, however, curve 42 is shifted to the left, i.e., to smaller values of absolute (as opposed to relative) buffer occupancy. Thus, the fraction of the packets in the queue to which controller 32 will apply statistical congestion control increases as the allocation size of allocation 28 decreases in response to increasing buffer occupancy by other queues.

Figure 3:
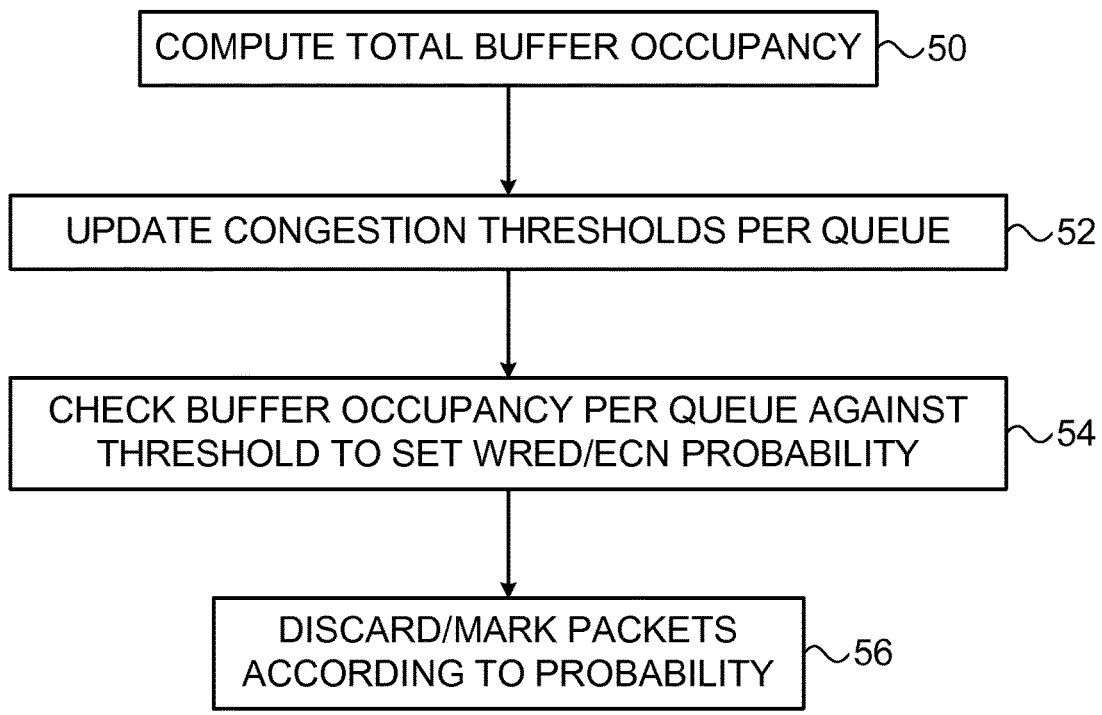
FIG. 3 is a flow chart that schematically illustrates a method for congestion control, in accordance with an embodiment of the invention.

FIG. 3 is a flow chart that schematically illustrates a method for congestion control, in accordance with an embodiment of the invention. As noted earlier, the method is described herein with reference to switch 20 (FIG. 1) but may alternatively be applied in switches and network elements of other sorts. Controller 32 iterates through steps of the method periodically, typically at regular intervals, such as once every microsecond.

In each iteration, controller 32 computes the total, cumulative occupancy of memory 26 by all of the queues sharing the buffer, $\Sigma_i Q^i(t)$, at an occupancy checking step 50. On this basis, the controller is able to compute the size of unused portion 30 of the memory, $B - \Sigma_i Q^i(t)$. Based on the size of the unused portion of the buffer, controller 32 computes the congestion threshold T(t) for each queue t, at a threshold updating step 52. This threshold may be in a constant proportion α to the size of the unused buffer (wherein α may vary from queue to queue), or it may alternatively be computed on some other basis relative to the unused buffer size and/or the lengths of other queues. As explained earlier, switch 20 will discard and/or inhibit packets arriving from network 24 for a given queue if the length of the queue exceeds the respective congestion threshold.

Controller 32 compares the buffer occupancy (i.e., the queue length) of each queue against the respective threshold T(t), at an occupancy checking step 54. On this basis, the controller sets the congestion control probability for the queue, meaning the fraction of the packets in the queue to which congestion control measures will be applied. As illustrated above in FIG. 2, for example, the controller may compute the respective ratio of the queue length to the current congestion threshold for each queue and then set the congestion control probability as a function of this ratio. The congestion control probability thus computed for each queue determines the fraction of packets in the queue to which switch 20 is to apply congestion control measures, at a congestion control step 56. For example, this fraction of the packets may be discarded for purposes of WRED or marked in accordance with the applicable ECN protocol, or may be subject to any other suitable sorts of congestion control measures that are known in the art.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
multiple interfaces configured for connection to a packet data network;
a memory coupled to the interfaces and configured as a shared buffer to contain packets in multiple sets of queues for transmission to the network, each set of queues receiving in the shared buffer a respective allocation having an allocation size that varies over time in response to an amount of space in the shared buffer that is unused at any given time; and
a controller, which is configured to periodically:
determine, for each set of queues, a current length of the queues,
compute a size of an unused portion of the memory,
compute for each set of queues a threshold responsive to the computed size of unused memory,
set a probability of marking packets with a congestion marking, for each set of queues, in response to the determined current length of the queue, a current allocation size of the set of queues and the computed threshold, and
mark a respective fraction of the packets that are queued for transmission from each set of queues in the shared buffer to the network, according to the currently set probability.

2. The apparatus according to claim 1, wherein the allocation size for each set of queues at any given time is determined by a threshold, which is equal to a product of the amount of the unused space in the buffer multiplied by a respective constant of proportionality.

3. The apparatus according to claim 2, wherein the respective constant of proportionality is set to different, respective values for different ones of the sets of queues.

4. The apparatus according to claim 1, wherein the respective fraction of the packets in each set of queues increases as the current length of the set of queues approaches the allocation size of the respective allocation.

5. The apparatus according to claim 1, wherein the respective fraction of the packets in each set of queues increases as the allocation size of the set of queues decreases in response to increasing buffer occupancy by other queues.

6. The apparatus according to claim 1, wherein the controller is configured to compute the respective fraction of the packets in each set of queues as a function of a ratio between the length of the queues in the set and the allocation size of the set of queues.

7. A method for communication, comprising:
in a network element having multiple interfaces connected to a packet data network and a memory coupled to the interfaces and configured as a shared buffer to contain packets in multiple sets of queues for transmission to the network, allocating to each set of queues in the shared buffer a respective allocation having an allocation size that varies over time in response to an amount of space in the shared buffer that is unused at any given time; and
periodically performing:
determining, for each set of queues, a current length of the queues,
computing a size of an unused portion of the memory,
computing, for each set of queues, a threshold responsive to the computed size of unused memory,
setting a probability of marking packets with a congestion marking, for each set of queues, in response to the determined current length of the queue, a current allocation size of the set of queues and the computed threshold, and
marking a respective fraction of the packets that are queued for transmission from each set of queues in the shared buffer to the network, according to the currently set probability.

8. The method according to claim 7, wherein allocating the respective allocation comprises setting for each set of queues a respective threshold, which is equal to a product of the amount of the unused space in the buffer multiplied by a respective constant of proportionality.

9. The method according to claim 8, wherein the respective constant of proportionality is set to different, respective values for different ones of the sets of queues.

10. The method according to claim 7, wherein the respective fraction of the packets in each set of queues to which the congestion control is applied increases as the current length of the queues in the set approaches the allocation size of the respective allocation.

11. The method according to claim 7, wherein the respective fraction of the packets in each set of queues increases as the allocation size of the set of queues decreases in response to increasing buffer occupancy by other queues.

12. The method according to claim 7, wherein applying congestion control comprises computing the respective fraction of the packets in each set of queues as a function of a ratio between the length of the queues in the set and the allocation size of the set of queues.

* * * * *